# United States Patent [19]

Ferguson

[11] 4,109,447
[45] Aug. 29, 1978

[54] MOWER OF THE CROSS-FLOW BLOWER TYPE WITH BLADES OF OPPOSITE HELIX ANGLE

[76] Inventor: Hugo S. Ferguson, R.D. #2, Averill Park, New York, N.Y. 12180

[21] Appl. No.: 741,132

[22] Filed: Nov. 11, 1976

[51] Int. Cl.² .............................................. A01D 35/24
[52] U.S. Cl. ........................................ 56/13.3; 56/294
[58] Field of Search ...................... 56/12.9, 13.3, 13.4, 56/16.7, 17.5, 249, 294

[56] References Cited

U.S. PATENT DOCUMENTS

| | | | |
|---|---|---|---|
| 2,734,328 | 2/1956 | Wood | 56/249 |
| 3,084,493 | 4/1963 | Kucera | 56/294 |
| 3,673,773 | 7/1972 | Ferguson | 56/13.3 |
| 3,818,684 | 6/1974 | Ferguson | 56/294 |

FOREIGN PATENT DOCUMENTS 372,971  8/1973  U.S.S.R. .................................. 56/13.3

*Primary Examiner*—Jay N. Eskovitz

*Attorney, Agent, or Firm*—Pennie & Edmonds

[57] ABSTRACT

In a mower of the cross-flow blower type the rotor of the blower has a plurality of sections with predetermined blades of at least two adjacent sections of opposite helix angle and having cutting edges which overlap in the axial direction and are angularly spaced about the rotor axis in the overlap region, thereby producing counteracting axial components of air velocity. Preferably at least one blade in each section is shorter than the rotor length and advantgeously all blades in a section are shorter, with ends angularly spaced from and overlapping the ends of the blades of adjacent sections. Preferably each section has blades of opposite helix angle to produce counteracting components of air velocity in each section. Advantageously each section of the rotor is formed of an integral sheet bent to form end supports and a pair of blades of opposite helix angle. The blades are preferably of the hook type with the leading edges of the hooks serrated. Marked reduction in blower noise can be attained, with good mower performance.

15 Claims, 14 Drawing Figures

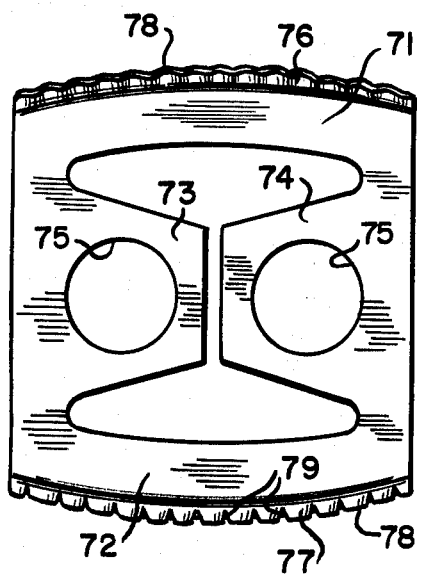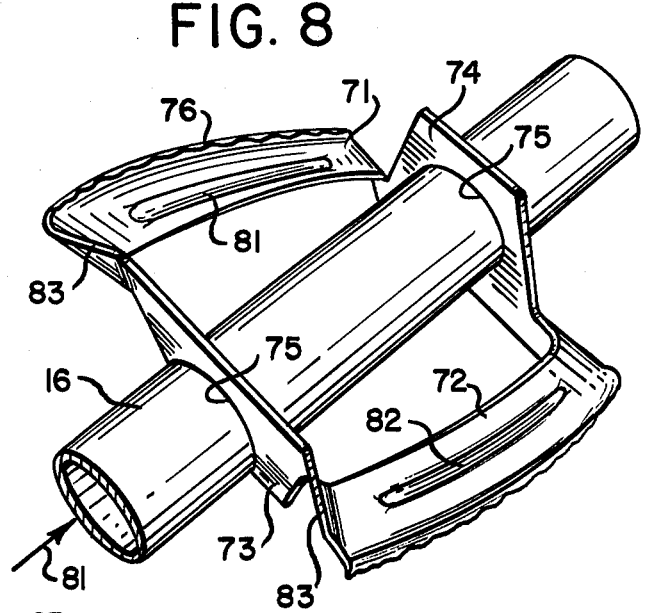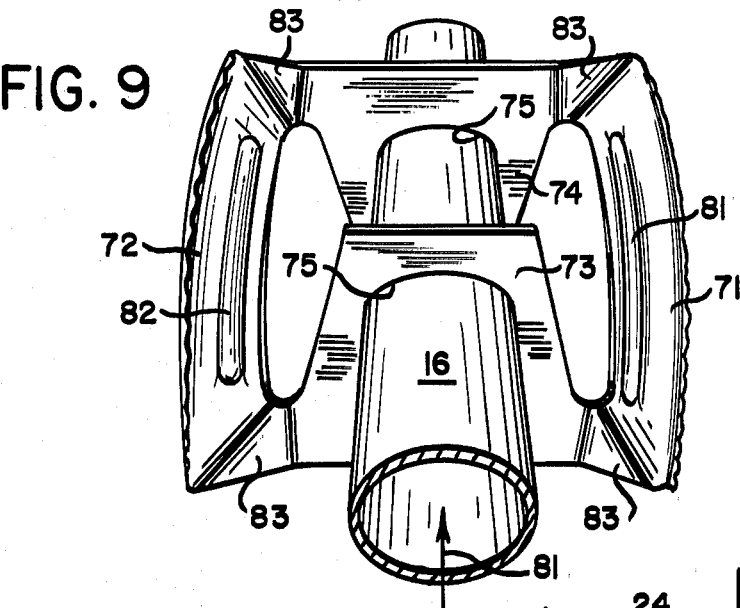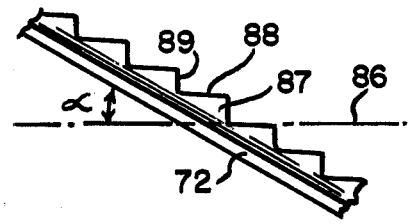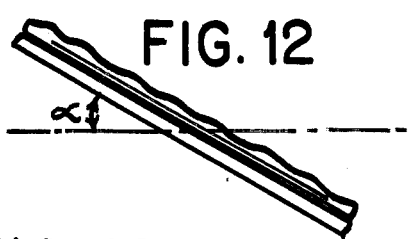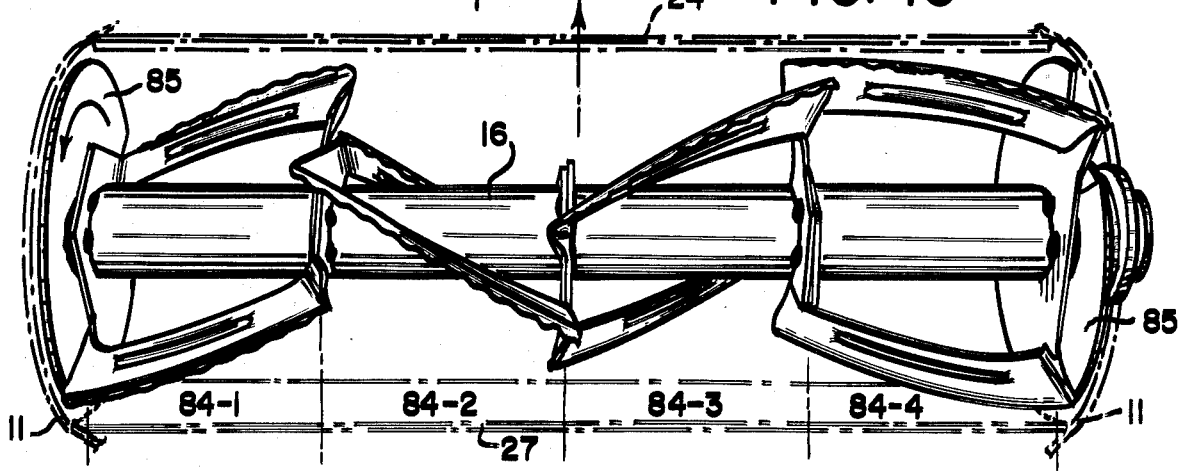

MOWER OF THE CROSS-FLOW BLOWER TYPE WITH BLADES OF OPPOSITE HELIX ANGLE

This invention relates to mowers of the cross-flow blower type.

Such mowers are described in my U.S. Pat. No. 3,673,773 and comprise a cylindrical reel having a plurality of spaced blades horizontally mounted on a carriage with the reel axis extending laterally of the carriage. A blower conduit cooperates with the reel to form a blower of the cross-flow or transverse-flow type. The outer leading edges of the blades are sharp to form cutting edges. No bed knife or shear plate is employed. In the preferred arrangements the reel rotates in a direction such that the lower blades move in the forward direction with respect to the normal direction of travel of the mower, and the outer edges of the blades are forwardly hooked.

In mower operation air is drawn into the blower from in front of the mower and draws the grass toward the forwardly moving lower blades so that the grass is cut effectively. The grass clippings are discharged from the outlet of the blower and may be directed toward the ground, discharged to the side, or collected in a grass catcher.

In a cross-flow blower air is drawn into the rotor at the inlet region, passes through the interior of the rotor, and then passes out of the rotor at the outlet region. Thus the air passes through the blades twice in a direction transverse to the rotor axis. Vortex components around the blades are involved in the functioning of the blower.

In my U.S. Pat. No. 3,818,684 certain improvements are described including a forward extension on the housing which causes an auxiliary vortex to be developed.

Mowers made in accordance with the aforesaid patents are capable of excellent performance, and combine many of the advantages of the conventional rotary and reel type mowers while avoiding serious disadvantages of such mowers, and possessing some additional advantages. Thus, both normal and tall grass can be cut as in the case of rotary mowers, but with much greater safety since objects struck by the blades move only in the forward direction and the mower can be practically completely shielded in this direction. As compared to a conventional reel mower, no bed knife or shear plate is employed, thus greatly simplifying sharpening and eliminating the need for precise adjustment. In addition, the blower action largely picks up leaves and similar debris.

In recent years increased attention has been paid to noise created by lawn mowers, as part of the general program to reduce environmental noise. Inasmuch as the majority of power mowers use gasoline engines, much effort has been expanded on reducing engine noise without excessive increase in cost or weight, or decrease in performance.

In mowers or the cross-flow blower type blower noise contributes to the overall noise level. While engine noise can be reduced by muffling, etc., using more or less conventional techniques, reducing blower noise while preserving good mowing qualities is much more involved. Blower noise can be reduced by employing helical blades instead of the straight blades commonly used in cross-flow blowers per se, as described in U.S. Pat. No. 3,673,773, supra. However, further reduction is desirable in order to meet increasingly stringent environmental regulations, and to promote consumer acceptance.

In attempting to reduce blower noise, fewer blades and lower blade velocities have been tried. This does reduce blower noise, but at the expense of reducing mower performance, particularly with tough, wiry types of grass which are difficult to cut. Increasing the helix angle of the blades has also been tried, say up to 45°. This too reduces noise, but is found to result in a marked change in mowing performance from one end of the reel to the other. Analysis has indicated that this is due, at least in part, to axial components of air flow which change the direction of air flow through the reel at different points along the reel, and change the through-put of air at different points along the reel as well as the direction of the air flow in the outlet region.

Among the factors involved in maintaining good performance while reducing noise are: (a) uniformity of air flow from one end of the reel to the other and proper direction of air flow in inlet and outlet regions of the blower, as well as through the reel; (b) maintaining good cutting qualities without leaving ridges, etc.; and (c) keeping the hooks clean when employing hook-type blades (as is preferred) so that good cutting is maintained. Mechanical considerations such as blade strength and rotor balance must be kept in mind. Also, it is highly important that the design yield a reel which can be economically manufactured.

The term "rotor" instead of "reel" will be used hereinafter, since the rotors used in the cross-flow mowers of the present invention differ markedly in appearance from those previously employed, and involve new concepts although the basic principles of cross-flow operation are preserved.

It has been found that blower noise can be substantially reduced while preserving good mowing performance by arranging the rotor blades in such a manner as to produce counteracting axial components of air flow. This enables increasing the helix angle of the rotor blades without impairing mower performance, and even enables enhanced performance.

Broadly, the rotor is arranged with a plurality of sections along the rotor axis and predetermined blades of at least two adjacent sections are of opposite helix angle and have cutting edges which overlap in the axial direction and are angularly spaced about the rotor axis in the overlap region. Preferably at least one blade in each section is shorter than the rotor length with ends angularly spaced from the blades of adjacent sections, and advantageously all blades of each section are shorter than the rotor length with the ends of the blades of each section angularly spaced from and overlapping the ends of the blades of adjacent sections. With hook-type blades, preferably the leading edges of the hooks are serrated.

With blades of opposite helix angle, the axial components of air flow are opposite in direction and hence counteract each other, or at least reduce adverse effects on mowing performance. Normal components of air flow are in the same direction, however, thereby preserving the desired through-put of air.

In accordance with the preferred embodiments, the blades are arranged so that at least one blade in each section is of opposite helix angle to another blade in the same section. In this manner the axial component of air velocity produced by one blade is counteracted by the axial component in the opposite direction produced by another blade in the same section. With two blades of opposite helix angle in each section, as is presently preferred, or in general an even number of blades with one-half of opposite helix angle to the other half, cancellation of axial components can be obtained within each section. With the ends of the blades in one section angularly spaced from and overlapping the ends of the blades of adjacent sections, as is preferred, the overlapping ends move successively in the same path of travel circumferentially of the rotor so that opposite axial components at the overlapping ends largely cancel, and effective cutting is maintained.

Angular spacing of the ends of the blades in adjacent sections greatly enhances the cleaning of the blades, so that relatively large hooks can be employed without loading up during use.

Reducing the number of blades and/or increasing the helix angles to reduce noise is accompanied by a reduction in the through-put of air, other factors being the same. Although seemingly disadvantageous, it has been found that, with counteracting axial components of air flow, higher tip velocities can be employed to increase the effectiveness of cutting certain types of grass, such as tough wiry grass, without requiring an excessively large motor. Thus enhanced mower performance can be attained while at the same time reducing blower noise.

To enable economical manufacture, the present invention provides a rotor in which each section is formed of an integral sheet with bent parallel end supports for mounting the section on an axle, and a pair of blades of opposite helix angle extending between outer ends of the end supports on opposite sides of the axle. A plurality of sections have adjacent end supports joined together and to the axle.

Other features and advantages of the invention will be pointed out in the following description of specific embodiments thereof, taken on conjunction with the drawings in which:

FIGS. 7-9 illustrate the fabrication of individual sections of a modified rotor of the invention, suitable for economical manufacture;

FIG. 10 shows a rotor formed with individual sections according to FIGS. 7-9;

FIGS. 11 and 12 are detail views of serrated blades for use in the rotors of the present invention.

Mowers of the cross-flow blower type, using blower arrangements in accordance with the present invention, may be built using carriage and blower conduit arrangements as described in the aforesaid U.S. Pat. Nos. 3,673,773 and 3,818,684. However, the mower of FIGS. 1-3 contains additional features which will be the subject of other patent applications, and are given here to illustrate a presently preferred mower construction.

Figure 1:
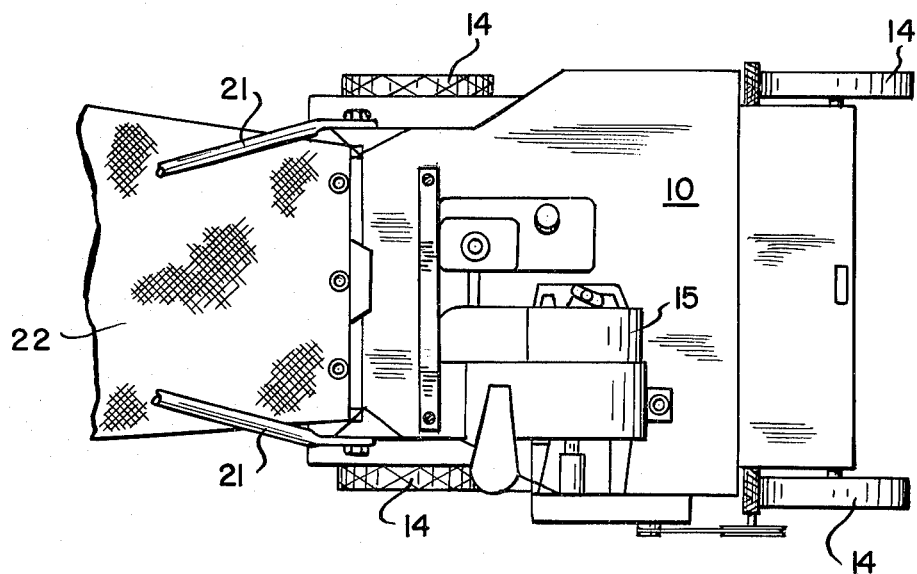
FIG. 1 is a top view of a mower in which the present invention is used.
Figure 2:
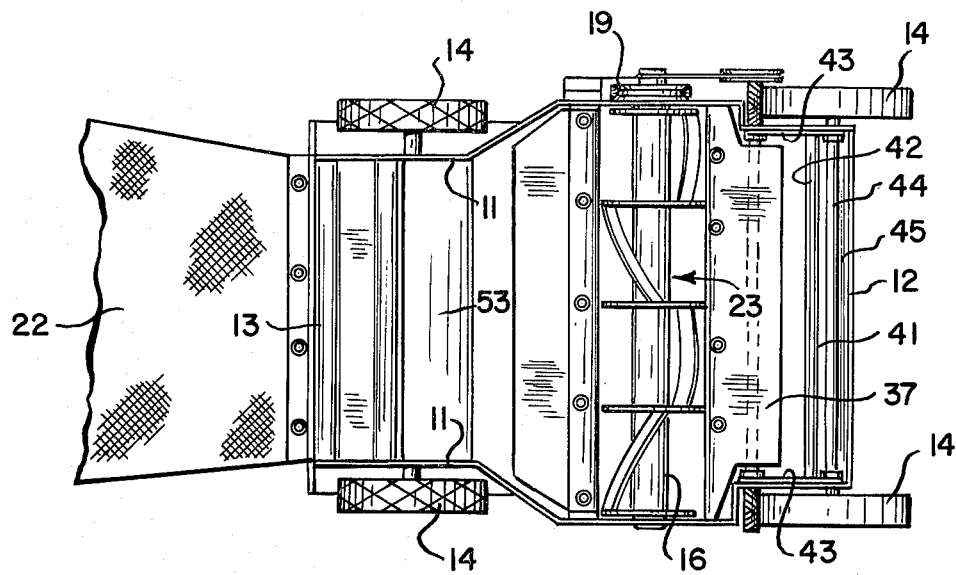
FIG. 2 is a bottom view of the mower.

Referring to FIGS. 1 and 2, the mower carriage includes a top 10, sides 11, front and rear frame members 12, 13 and wheels 14. Motor 15 is mounted on top 10 and drives the axle 16 of the rotor through a belt 17 (FIG. 3) and pulleys 18, 19. Front wheel drive is provided, but need not be described. A handle 21 is attached to the carriage in desired manner, and a bag 22 for receiving cut grass may be removably attached.

The rotor is generally designated as 23 and has a blower conduit cooperating therewith to form a cross-flow blower. Several embodiments of the rotor will be described hereinafter. The blower conduit is shown in cross-section in FIG. 3.

Figure 3:
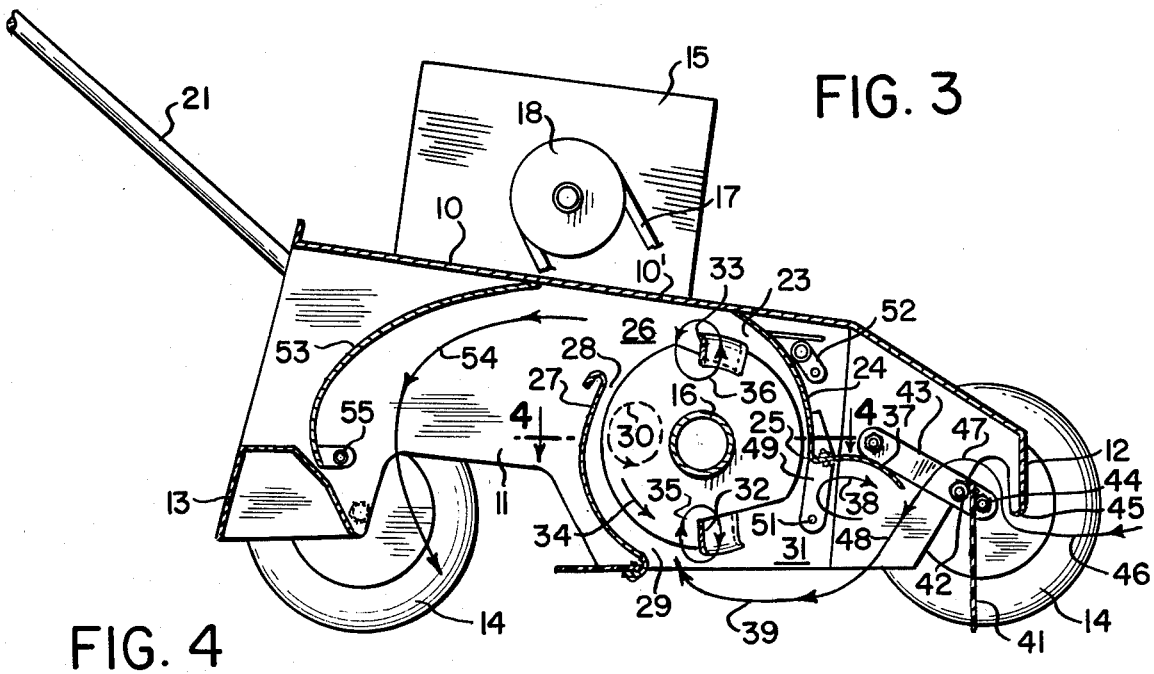
FIG. 3 is a vertical section through the mower.

Referring to FIG. 3, the blower conduit comprises an upper wall section including a transversely extending sheet member 24 merging with a portion 10' of the top 10. Member 24 is close to the rotor at 25 and the separation from the rotor gradually increases toward the rear outlet region 26 of the blower. A lower wall section of the blower conduit is formed by a transversely extending sheet member 27. This also is close to the rotor, particularly at 28, and to a lesser extent at 29. In between 28 and 29 the member 27 may be curved away from the rotor to promote air flow into the rotor from the inlet region 31. This feature will not be described further herein, since it is not necessary for an understanding of the present invention.

Blades 32 and 33 of the rotor are here shown with forwardly extending outer hooks of the type described in the above-identified patents. This type is preferred, and the rotor is driven in the direction indicated by arrow 34 with the blades in their lower positions moving forwardly in the forward direction of travel of the mower. As the blades move, vortex components are produced therearound which are in one direction of rotation in the inlet region as shown by arrow 35, and in the opposite direction in the outlet region as shown by arrow 36.

The action of a cross-flow blower is commonly explained in terms of a vortex representing an actual eddy or whirlpool of air at or near the region where the blades pass from the outlet to the inlet regions. It is believed that such a vortex exists at or near the region 30. However the actual configuration is difficult to determine and hence dash lines are employed. Although this may explain the overall functioning as a blower, for lawn mowing purposes it is believed that the presence of vortex components around the blades is more significant. The vortex action results in air being drawn into the inlet region, passing through the open rotor structure, and then to the outlet region. A curved front extension 37 in the upper wall of the blower conduit promotes the formation of an auxiliary vortex 38 as described in U.S. Pat. No. 3,818,684, supra.

Overall, a major portion of the air flow in the inlet region 31 is at the lower portion thereof, as indicated by arrow 39, so that there is a substantial component of velocity tangential to the rotor, and opposite to the direction of movement of the blades. Thus grass to be cut is forced against the blades, thereby promoting effective mowing. Further details of the air flow are given in the above-identified patents.

Inasmuch as the vortices 35, 36 around the blades reverse in passing from the inlet to the outlet region, the portion of upper plate 24 adjacent the inlet region may be termed the front vortex breaker, for convenience. Similarly, inasmuch as the vortices reverse as the blades pass from the outlet region to the inlet region, the lower plate 27 may be termed the rear vortex breaker.

In the embodiment shown in FIGS. 1–3, a sheet 41 of tough flexible material such as ethylene vinyl acetate (EVA) is placed across the front of the mower in position to intercept any object which may be hit by the blades and thrown forward. The top of the sheet is advantageously attached to a cross bar 42 extending between the links 43 on the ends of which axle 44 for the wheels is mounted. Thus, as the height of the mower is adjusted, the lower end of sheet 41 remains close to the ground, thereby providing practically complete protection against thrown objects.

In order to supply sufficient air to the blower despite the blocking action of sheet 41, a space is provided between the sheet and the forward lip 45 of the housing. Thus air from in front of the mower, indicated at 46, flows over the top of sheet 41, cross-bar 42 and axle 44, as indicated at 47, and then downward as indicated at 48.

Sheet member 24 is here shown as attached to an arm 49 which is pivoted at 51 to one side of the housing, and to a similar arm at the other side. The under side of the sheet member 24 is provided with abrasive material and the member is pressed against the rotor blades by a cam arm 52 each time the rotor is declutched from the driving motor (by means not shown), thereby sharpening the blades and also braking the rotor. This will be described more fully in a separate application, and claimed therein.

In the outlet region, curved plate 53 directs the flow of air toward the ground, together with cut grass carried thereby, as indicated by arrow 54. Plate 53 is pivoted to the sides of the housing, as indicated at 55, and may be moved downward when bagging is desired.

Figure 4:
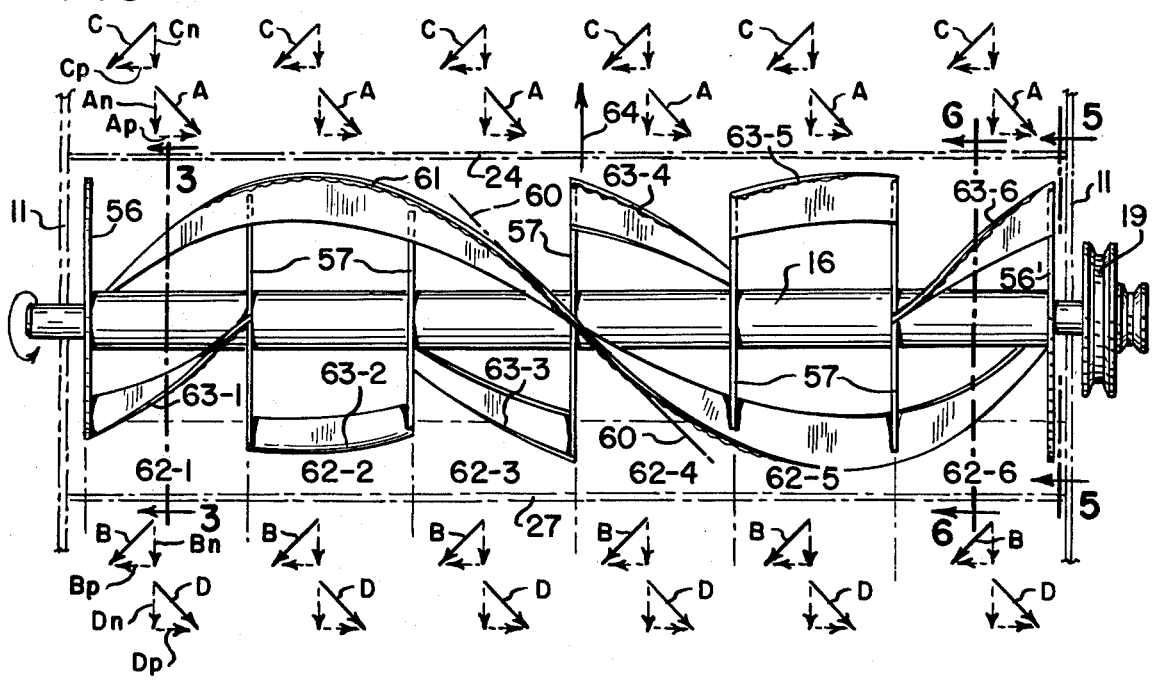
FIG. 4 shows one embodiment of a rotor in accordance with the invention which may be used in the mower of FIGS. 1-3, taken along the line 4—4 of FIG. 3.
Figure 5:
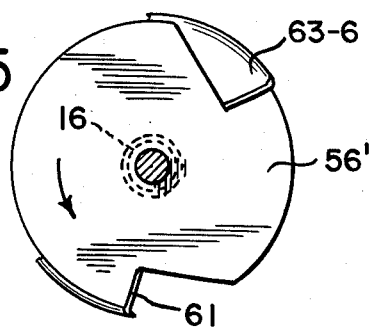
FIGS. 5 and 6 show end plate and spider configurations for the rotor of FIG. 4.
Figure 6:
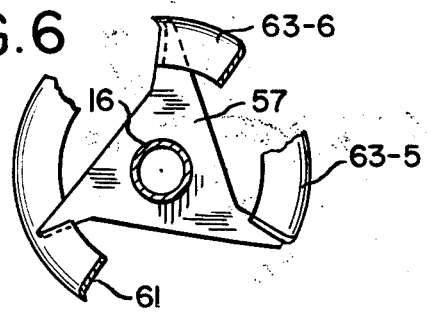

Referring to FIG. 4, one embodiment of a cross-flow mower with a rotor in accordance with the invention is illustrated. The front vortex breaker is indicated at 24 and the rear vortex breaker at 27, looking down as indicated at 4—4 of FIG. 3. The sides of the conduit are indicated at 11. The rotor has end plates 56, 56' affixed to the tubular shaft 16, with intermediate spiders 57. Details of these are shown in FIGS. 5 and 6.

Helical blade 61 is here shown as a continuous blade extending from one end of the rotor to the other, and having a helix angle in one direction. The blade is twisted through a desired angle, here about 360°, between the plates 56, 56' to which it is attached. Axially spaced spiders 57 provide intermediate support. The rotor may be considered to have a plurality of spaced sections 62-1 through 62-6 along the rotor axis, formed by the end plates and spiders. A portion of blade 61 lies in each section, and the several portions have the same direction of helix angle in respective sections.

In each section there is another blade 63-1 . . . 63-6 which is circumferentially spaced from the respective section of blade 61 and is of opposite helix angle. Thus, looking along the rotor from the left end, blade 61 twists clockwise whereas blades 63 twist counterclockwise. As here shown, blades 63 have equal and opposite helix angles with respect to blade 61, and at the center of each section 62 the blades are on opposite sides of axle 16, with approximately a 180° angular spacing around the axle. Thus, with six sections and blade 61 twisting through 360°, there is a 60° twist in each section. Each blade 63 twists through approximately 60° in the opposite direction. With one end of a blade 63 at a 120° angle with respect to blade 61, the other end of the same blade 63 will be at a 240° angle. Midway in the corresponding section the blades will be 180° apart.

Hence, in a given section, the blades are, broadly speaking, on opposite sides of the axle.

FIG. 5 shows rotor end plate 56' with the end of blade 63-6 leading the end of blade 61 by 120°, taken in the direction of the arrow. In FIG. 6 the cross-sections of the blades are taken at the middle of section 62-6 in a plane perpendicular to the axis, and hence are 180° apart, that is, diametrically opposite. At the spider 57, the end of blade 63-6 leads blade 61 by 240°.

Considering the direction of air flow, in FIG. 4 the arrow 64 indicates the forward direction of travel of the mower. Hence, as shown in FIG. 3, air flow in the inlet region will be in the opposite direction, generally speaking. However, the direction of air flow at the blade is approximately perpendicular to the tangent to the blade at any given point. Accordingly, the portion of blade 61 in each section produces air velocities into the rotor sections as shown by vectors A.

Vectors A are drawn in approximately a horizontal plane just beneath the rotor in the inlet region where input air flow is strongest. Since each blade moves upward in the inlet region as the rotor rotates, the air flow will be inclined to the horizontal at higher points in the inlet region 31. No attempt will be made to show such vectors, since the purpose of the present explanation is to describe generally what is believed to occur.

Each vector A will have a component $A_n$ normal or perpendicular to the rotor axis, and a component $A_p$ parallel to the rotor axis. The vector angle with respect to a line normal to the rotor axis is approximately equal to the helix angle of the blade. Thus with a 45° angle as shown, the vector components are equal and have a magnitude about 0.7 of the magnitude of the vector itself.

In the outlet region similar vector air flow velocities are produced. However, the vectors are of opposite inclination to those in the inlet region since the tangent to the blade is of opposite angle with respect to the axis of the rotor. Vectors B are drawn for approximately a horizontal plane in the outlet region 26 of FIG. 3. Here also the air flow will be inclined to the horizontal at different points in the outlet region, but the vectors shown will suffice for purposes of explanation. The vectors have components $B_n$ normal to the rotor axis. As will be noted, components $B_p$ are opposite in direction to components $A_p$.

The air components $A_n$ and $B_n$ normal to the rotor axis produce useful through-put from inlet to outlet regions of the blower. The lateral air components $A_p$ and $B_p$ parallel to the rotor axis, however, can produce highly deleterious results unless properly counteracted.

If, instead of the arrangement shown in FIG. 4, two or more continuous blades like blade 61 were angularly spaced about the axle, as in the cross-flow mowers described in the above-identified patents, good results can be obtained with the helix angles normally employed. The angles are usually in the range of about 15°, although somewhat greater angles have been employed. It has been found that when larger helix angles are employed, in an effort to reduce blower noise, the mowing performance is adversely affected.

It is believed that the adverse effect is due largely to the lateral or axial components of air velocity, such as are illustrated by vectors $A_p$ and $B_p$ and particularly the lateral components in the outlet region adjacent the rotor. These lateral components result in air flow in the lateral direction and when the lateral flow reaches the end of the reel it is blocked by the side of the blower conduit and/or the end of the rotor. Thus the lateral air flow is deflected and a portion may flow downward. This may conveniently be called "blow-down." The blow-down may partially counteract the input flow of air or even cause a downward flow of air which blows the grass away from the blades. As a result the mower cuts poorer toward the end of the rotor in the region of the blow-down and leaves a strip of uncut or only partially cut grass when the helix angle is increased to reduce noise.

The exact distribution and deviation of air flow adjacent and within the rotor is complex and difficult to analyze or determine precisely. Therefore, although the above explanation is believed to be essentially correct, it is not insisted upon and is subject to further elaboration. However, the fact that adverse effects on mowing performance exist, and that measures taken to counteract the axial components can be effective, have been demonstrated.

Returning now to the arrangement as shown in FIG. 4, the continuous blade 61 functions as described above. The blades 63, however, being of opposite helix angle, produce air velocities C and D in the inlet and outlet regions which are inclined in the opposite direction to vectors A and B, respectively. The normal components $C_n$ and $D_n$ are the same as for vectors A and B. However, the axial components $C_p$ and $D_p$ are opposite in direction to those of A and B. Thus in each section 62 the axial components reverse in rapid succession as the blades rotate. This may create some turbulence. However, it is believed that a kind of integrating action takes place such that the net axial flow is markedly reduced or substantially eliminated, while maintaining the desired through-put. Since the cancellation takes place in each section, there is no cumulative effect along the rotor axis, and the negative air pressure in the inlet region is substantially uniform along the rotor, and the positive air pressure in the outlet region is substantially uniform along the rotor.

As a result, it has been found that a considerable reduction in blower noise can be obtained, along with good mower performance, and with even distribution of grass clippings on the ground when bagging is not employed.

Rotors such as shown in FIG. 4 are somewhat expensive to fabricate. Hence a less expensive construction has been sought which will yield the same performance characteristics or even improve upon them.

Referring to FIGS. 7-10, a rotor structure is shown which greatly facilitates economical production, and which has been found to give excellent performance. Here a four section rotor is shown and each section is fabricated from a single sheet of metal. The sections are then assembled on a tubular axle and joined together. More sections could be used to make a longer rotor for mowers where a larger width of cut is desired, such as a riding mower.

FIG. 7 shows the initial stage wherein a flat steel plate has been stamped to form blade sections 71, 72 and ear sections 73, 74 with holes 75 for receiving a rotor shaft. The blade sections are turned over in opposite directions at their outer edges 76, 77 to eventually form the hook portions of the blades. The turned over portions are corrugated as indicated at 78, and provided with indentations 79 so that when the rotor is assembled and the outer edges of the blades sharpened, the leading edges of the hook portions will be sharp and serrated. The serrations will be discussed further hereinafter.

FIG. 8 shows the plate of FIG. 7 after bending and shaping between suitable dies. Ear sections 73 and 74 have been bent in opposite directions, with section 73 turned down and section 74 turned upward, thus forming parallel end supports perpendicular to the rotor axis. The holes 75 are in alignment to receive axle 16. The blades 71, 72 extend between outer ends of the end supports. Blade 71 has been shaped to twist in one direction about shaft 16, and blade 77 in the opposite direction. Viewed in the direction of arrow 81, the helix angle is counterclockwise for blade 71 and clockwise for blade 72. Ribs 82 may be formed lengthwise in the blades to add stiffness.

FIG. 9 is a view of the section of FIG. 8, but with the section rotated through 180° and viewed from a different angle. The twist of blade 71 is still counterclockwise as viewed in direction 81, and that of blade 72 clockwise.

As will be observed in FIGS. 8 and 9, small outer portions 83 of the end plates formed by ears 73, 74 are bent outward from respective planes perpendicular to the shaft 16, so that the axial length of the blades is greater than the separation of the end plates. This enables overlapping as discussed below. The angles between sections 83 and the end plates, and between 83 and the blades, are all greater than 90° and hence obtuse angles, so that difficulties in die shaping when acute angles are present are avoided.

FIG. 10 shows a rotor assembled from a plurality of the individual sections of FIGS. 8, 9. Here four sections 84-1 and 84-4 are employed and adjacent sections are rotationally displaced. Abutting end supports are joined as by welding, and disk end plates 85 are joined to the outer supports. The several sections are also affixed to the shaft, as by welding. The rotor is placed in a conduit housing such as shown in FIG. 3 and portions of the housing are indicated at 24, 27 and 11, similar to FIG. 4. The cancellation of axial components of air velocity is similar to that described in connection with FIG. 4. Here, however, the continuous blade 61 is replaced by shorter blades and the ends of both blades of each section are angularly spaced from the ends of the blades of adjacent sections. This is advantageous in promoting good hook cleaning, and assists in reducing noise.

At the free ends of the blades, some turbulence may be expected to exist, perhaps aggravated by the opposite directions of the axial components of air velocity as successive tips pass the same point in space. Thus the mowing effectiveness at the extreme tips may be impaired. It has been found advantageous to overlap in the axial direction the ends of the blades of adjacent sections to avoid striping the lawn. The outwardly bent sections 83 shown in FIGS. 8 and 9 provide the desired overlapping when the remaining portions of the end supports are contiguous, as is evident in FIG. 10.

The type of construction illustrated in FIGS. 7-10 has important advantages from the viewpoint of economical manufacture. Since the individual sections may be formed by stamping, bending, etc. and the assembly of sections to form the rotor is relatively simple, quantity production at low cost is greatly facilitated. Inasmuch as the blades of each section are unitary with the end supports of the section, there is no danger of individual blades breaking loose from their supports when driven at the relatively high speeds employed in use, thus avoiding quality control problems involved when blades are welded to support spiders, etc. Although the sections are affixed together and to the axis as by welding, this is primarily to prevent rotation of the sections with respect to the axle and is not relied upon to prevent blades from flying off.

As described before, when axial air components are cancelled in each section, larger helix angles may be employed. Larger hooks are advantageously employed as the helix angle is increased, so that the projected hooks in planes perpendicular to the rotor axis provide good cutting action. Larger hooks also increase the air flow produced by the blades, and help compensate for the use of two blades instead of three and the reduction in the air components perpendicular to the rotor.

With larger hooks, there is the dnager that the hooks will fill up during mowing, thereby reducing the mowing effectiveness. However, the larger axial components of air velocity at a given blade appear to promote self-cleaning, perhaps assisted by the components in the opposite direction produced by the other blade in the section. Further, with relatively short blades as in FIG. 10, and angular spaces between the trailing end of each blade and the blades of the adjacent section, clippings can fall off the trailing ends. The blade angle itself, with respect to the axis of rotation, may promote a sliding action of accumulated debris until it falls off.

As the helix angle increases, the through-put of air decreases, other conditions being the same. It has been found that this can be an advantage, rather than a disadvantage. For certain types of hard-to-cut grass, such as wiry tough grass, it has been found desirable to increase the blade velocity. Previously this required substantially more power and consequently a larger motor, as well as increasing the noise level. With the blowers of the present invention it has been found possible to increase the blade velocity substantially, without necessitating a larger motor, and while still keeping the blower noise at a sufficiently low level.

With larger helix angles, the axial components of air velocity and the less favorable angle at which the cutting edge of the blade strikes the grass appear to cause tough, wiry grass to slide on the edge before being cut, thereby causing shredding and uneven cutting. To prevent such action the cutting edge of the hook portion of the blade is advantageously notched or serrated. Desirably the notches or serrations have sharp edge portions parallel to the rotor axis with steps between them perpendicular to the rotor axis. This is shown in FIG. 11.

Referring to FIG. 11, a projection of a short section of a blade such as 72 is shown. Dot-dash line 86 represents the rotor axis and the angel $\alpha$ between the blade and the axis is the helix angle. The hook portion of the blade is indicated at 87, and is formed with sharp edges 88 parallel to the axis. The steps 89 between the sharp edges are perpendicular to axis 86.

It is somewhat difficult and expensive to form such serrations. Accordingly, in practice serrations more like those shown in FIG. 12 have been employed with success. These can conveniently be obtained by cylindrically sharpening the assembled rotor of FIG. 10.

With the rotor constructed as shown in FIG. 10, it has been found that blower noise can be reduced to a very low level with helix angles of about 30°. It is believed that in addition to the noise reduction resulting from the use of a larger helix angle and only two blades per section, the opposite helix angles in each section and the angular displacement from section to section assist in reducing noise by avoiding reinforcement of one particular noise frequency.

As an aid to the ready practice of the invention, and not by way of limitation, in one mower which has been operated successfully a rotor built in accordance with FIGS. 7–10 had an overall length of about 21 inches and a diameter of about 7½ inches, with a 2inch diameter axle. There were four sections as shown, and the helix angle was about 30°. The blades overlapped in the axial direction about ⅜ inch to ½ inch. The hook length was about 3/16 inch on an average, with about two serrations per inch. Blade tip velocities of about 8,000–9,000 feet per minute were employed. These parameters gave excellent mowing performance with very low blower noise.

Larger helix angles up to about 45 inches have been employed with success, but it has been found that in the construction shown in FIGS. 7–10 a 30° angle gives adequately low noise level. Larger hooks and higher tip velocities have also been employed with success.

Figure 13:
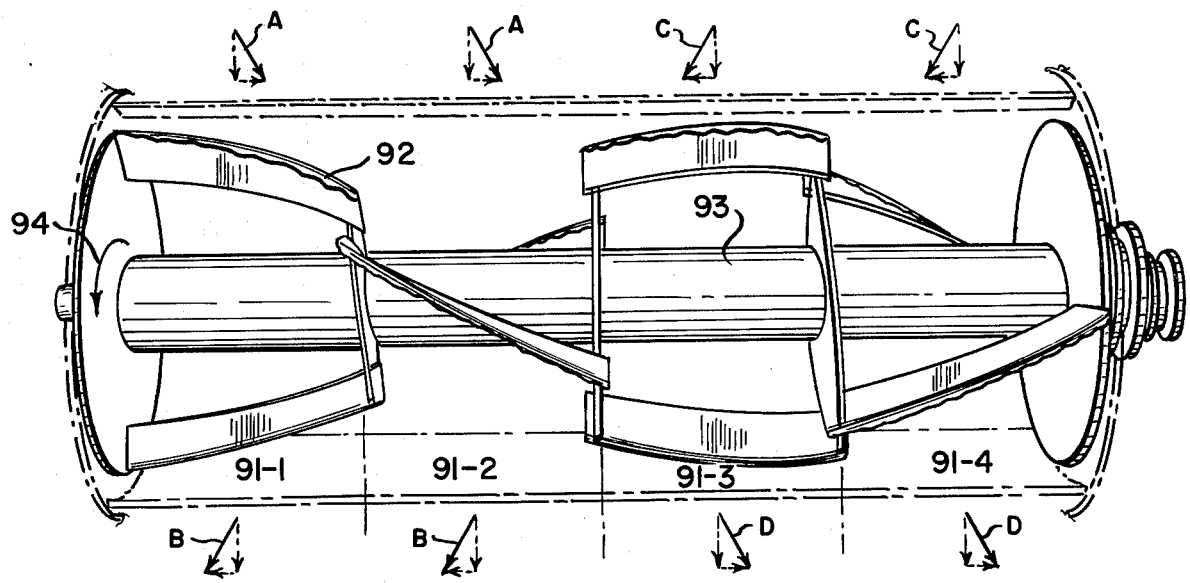
FIGS. 13 and 14 show other embodiments of rotors which may be used in the mower of FIGS. 1-3.

Although it is preferred to have blades of opposite helix angle in each section, it is possible to employ blades of the same helix angle or twist in a given section, and have the blades in selected sections twist in one direction and the blades in other sections twist in the opposite direction. FIG. 13 shows one such arrangement.

In FIG. 13 four sections 91-1 through 91-4 are shown. In sections 91-1 and 91-2 the blades all twist in the same direction, that is, clockwise as viewed from the left. In sections 91-3 and 91-4 the blades all twist in the opposite direction, that is, counterclockwise as viewed from the left. All the blades have serrated hooks, as indicated at 92. The blades in each section are angularly displaced about the reel axis 93 with respect to the blades in the adjacent sections, so that the ends of the blades in one section lie between the adjacent ends of the blades in the next section. Also the ends overlap. The direction of rotation is shown by arrow 94. As will be observed, the blades in sections 91-1 and 91-2 between the center of the rotor and the left end have trailing ends toward the left end. In sections 91-3 and 91-4 of the right half of the rotor, the trailing ends of the blades are toward the right end.

In the inlet region, the direction of air velocity in sections 91-1 and 91-2 is indicated by vectors A, with an axial component to the right. In the outlet region the air velocity is shown by vectors B, with an axial component to the left. In sections 91-3 and 91-4 the inlet air velocities are indicated by vectors C and the outlet velocities by vectors D. Overall the axial components produced in sections 91-1 and 91-2 are counteracted by the opposite axial components in sections 91-3 and 91-4.

Considerable blower noise reduction can be obtained with this design, and good mowing operation over most of the length of the rotor. Some blow-down appears to occur at the ends of the rotor, thus reducing the effective width of cut. This may be acceptable in practice, since rotary mowers are frequently subject to the same disadvantage.

Figure 14:
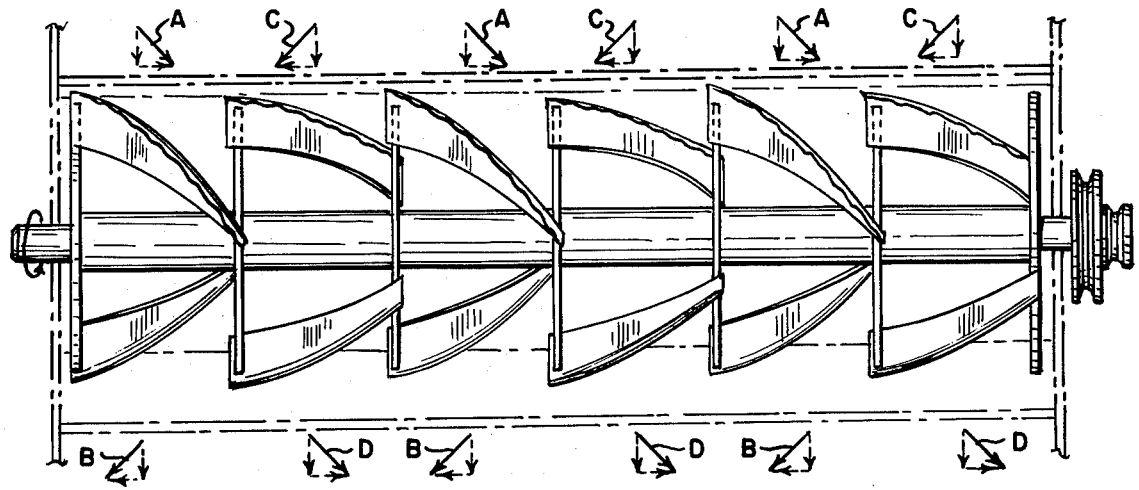

FIG. 14 shows a rotor similar to FIG. 13, but with the blades twisting in opposite directions from section to section in alternation. Thus the input air velocities alternate between A and C as shown, and the output air velocities alternate between B and D. Axial air flow is cancelled by the opposite helix angles in adjacent sections. The larger number of sections permits shorter sections and hence less blow-down per section, albeit at the expense of a more complicated construction.

At the present time opposed helix angles in each section, particularly the design shown in FIG. 10, are preferred since greater noise reduction, more uniform air flow along the rotor, full width uniform cut, good distribution of clippings behind the mower, and more economical manufacture have been obtained.

In the foregoing description the blades have been described as "helical." Long blades twisting from end to end of the rotor usually are a close approximation to a true helix, although departures from a true helix may be acceptable in practice. As the blades become short, their projection on a plane tangential to the generally cylindrical configuration of the rotor may be nearly straight, as is evident from FIG. 4 where the portion of blade 61 from the middle of section 62-3 to the middle of section 62-4 departs only slightly from a straight line 60. Hence, instead of twisted blades 62 as shown in FIG. 4, and the blades of FIGS. 10, 13 and 14, the projection of a blade in a plane tangential to a point midway between the ends of the blade could be straight or nearly so, and still be considered approximately helical. The projection of such a blade would still be at an angle to the axis, so that the term "helix angle" can still be employed.

The invention has been described in connection with specific embodiments thereof incorporating several features which promote overall performance. It will be understood that some features may be employed, while omitting others, as meets the requirements of a particular application.

I claim:

1. A mower of the cross-flow blower type comprising
   (a) a carriage,
   (b) a cylindrical rotor mounted on said carriage with the axis thereof substantially horizontal and extending laterally of the carriage,
   (c) said rotor having a plurality of sections along the axis thereof with a plurality of circumferentially-spaced approximately helical fixed blades in each section moving in the same path of travel and spaced from the rotor axis to leave the major portion of the interior of the rotor free for air flow through the rotor transversely thereof,
   (d) motor means for driving said rotor in a rotational direction such that the lower blades move in the normally forward direction of travel of the mower,
   (e) the outer leading edges of the blades being sharp to form cutting edges,
   (f) predetermined blades of at least two adjacent sections being of opposite helix angle and having cutting edges which overlap in the axial direction and are angularly spaced about the rotor axis in the overlap region thereof,
   (g) the cross-section of said blades having at least a portion on the leading side thereof which slopes backwardly and inwardly with respect to the direction of rotation of the rotor,
   (h) and a blower conduit cooperating with said rotor to form therewith a cross-flow blower,
   (i) said conduit comprising upper and lower wall sections extending laterally along the length of the rotor and having respective portions close to the rotor at circumferentially spaced positions separating inlet and outlet regions of the blower,
   (j) said inlet region opening downwardly and forwardly with a portion of the rotor therein exposed to material to be mowed,
   (k) the portions of the mower adjacent the rotor being non-shearingly spaced from the path of travel of said blades.

2. A mower according to claim 1 in which at least one blade in each of said sections is shorter than the rotor length with ends angularly spaced from the blades of adjacent sections.

3. A mower according to claim 1 in which the blades of each of said sections are shorter than the rotor length with the ends of the blades of each section angularly spaced from and overlapping the ends of the blades of adjacent sections.

4. A mower according to claim 1 in which the cross-sections of said blades have forwardly-extending hooks at the outer edge of the blades, said hooks being sharp to form said cutting edges and the leading edges of said hooks being serrated.

5. A mower according to claim 1 in which each of said sections of the reel includes at least one blade of opposite helix angle to another blade in the respective section.

6. A mower according to claim 1 in which one blade of each of said sections is a portion of a continuous blade extending approximately helically through a plurality of sections and a second blade in each section is shorter than the continuous blade and of opposite helix angle, the ends of said second blades in adjacent sections being angularly spaced from each other.

7. A lawn mower according to claim 6 in which, in a plane perpendicular to the rotor axis and midway between the ends of each section, the second blade is approximately diametrically opposite the corresponding portion of the continuous blade.

8. A lawn mower according to claim 1 in which the blades of a plurality of said sections have one direction of helix angle and the blades of another plurality of sections have the opposite direction of helix angle, the adjacent ends of the blades of adjacent sections being angularly spaced about the reel axis relatively to each other and overlapping in the axial direction.

9. A lawn mower according to claim 8 in which the blades in the sections between the center of the rotor and respective ends of the rotor have trailing ends toward the respective end of the rotor.

10. A lawn mower according to claim 8 in which said plurality of sections having blades of one direction of helix angle alternate with said plurality of sections having blades of the opposite direction of helix angle.

11. A mower of the cross-flow blower type comprising
    (a) a carriage,
    (b) a cylindrical rotor mounted on said carriage with the axis thereof substantially horizontal and extending laterally of the carriage,
    (c) said rotor having a plurality of sections along the axis thereof with a plurality of circumferentially-spaced approximately helical fixed blades in each section moving in the same path of travel and spaced from the rotor axis to leave the major portion of the interior of the rotor free for air flow through the rotor transversely thereof,
    (d) motor means for driving said rotor in a rotational direction such that the lower blades move in the normally forward direction of travel of the mower,
    (e) the outer leading edges of the blades being sharp to form cutting edges,
    (f) the cross-section of said blades having at least a portion on the leading side thereof which slopes backwardly and inwardly with respect to the direction of rotation of the rotor, (g) each of said sections of the rotor having at least two blades of opposite helix angle relative to each other with the ends of the blades in one section angularly spaced from and overlapping the ends of the blades of adjacent sections, (h) and a blower conduit cooperating with said rotor to form therewith a cross-flow blower, (i) said conduit comprising upper and lower wall sections extending laterally along the length of the rotor and having respective portions close to the rotor at circumferentially spaced positions separating inlet and outlet regions of the blower, (j) said inlet region opening downward and forwardly with a portion of the rotor therein exposed to material to be mowed, (k) the portions of the mower adjacent the rotor being non-shearingly spaced from the path of travel of said blades.

12. A mower according to claim 11 in which each of said sections has an even number of blades with one-half the number of blades of opposite helix angle to the other half.

13. A mower according to claim 11 in which each of said sections has two blades, the mid-points of the blades in each section being approximately diametrically opposite each other with respect to the rotor axis.

14. A mower according to claim 11 in which each of said sections of the rotor is formed of an integral sheet with ears bent in opposite directions to form parallel end supports perpendicular to the rotor axis and a pair of blades of opposite helix angle on opposite sides of the rotor axis extending between outer ends of said end supports, said rotor having an axle and the end supports of adjacent sections being affixed together and to the axle.

15. A mower according to claim 11 in which the cross-sections of said blades have forwardly-extending hooks at the outer edge of the blades, said hooks being sharp to form said cutting edges and the leading edges of said hooks being serrated.

* * * * *